United States Patent
Schindzielorz et al.

(10) Patent No.: US 8,408,595 B2
(45) Date of Patent: Apr. 2, 2013

(54) THERMOPLASTIC COATED, HEAT-SEALED AIRBAG

(75) Inventors: Michael Schindzielorz, Kernersville, NC (US); Edward Sescourka, Greensboro, NC (US)

(73) Assignee: Highland Industries, Inc., Kernersville, NC (US)

( * ) Notice: Subject to any disclaimer, the term of this patent is extended or adjusted under 35 U.S.C. 154(b) by 360 days.

(21) Appl. No.: 12/086,349

(22) PCT Filed: Dec. 12, 2006

(86) PCT No.: PCT/US2006/047203
§ 371 (c)(1),
(2), (4) Date: Jan. 12, 2009

(87) PCT Pub. No.: WO2007/070465
PCT Pub. Date: Jun. 21, 2007

(65) Prior Publication Data
US 2009/0167007 A1    Jul. 2, 2009

Related U.S. Application Data (60) Provisional application No. 60/749,098, filed on Dec. 12, 2005.

(51) Int. Cl.
*B60R 21/16*    (2006.01)
(52) U.S. Cl. .................. 280/743.1; 280/743.2
(58) Field of Classification Search ............ 280/743.1, 280/730.2, 731, 732, 743.2
See application file for complete search history.

(56) References Cited

U.S. PATENT DOCUMENTS

| | | | |
|---|---|---|---|
| 5,110,666 A |  | 5/1992 | Menzel et al. |
| 5,208,097 A | * | 5/1993 | Honma et al. ............ 442/164 |
| 5,505,485 A | * | 4/1996 | Breed ...................... 280/729 |
| 5,538,280 A | * | 7/1996 | Gray et al. ................ 280/743.1 |
| 5,618,595 A |  | 4/1997 | Matsushima et al. |
| 5,657,798 A |  | 8/1997 | Krummheuer et al. |
| 5,989,660 A | * | 11/1999 | Moriwaki et al. ......... 428/35.2 |
| 6,250,668 B1 |  | 6/2001 | Breed et al. |
| 6,413,597 B1 | * | 7/2002 | Hirai ........................ 428/35.2 |
| 6,502,853 B2 |  | 1/2003 | Keshavaraj |

(Continued)

FOREIGN PATENT DOCUMENTS

| EP | 0 485 599 A1 | 5/1992 |
| GB | 2 331 955 A | 6/1999 |

(Continued)

OTHER PUBLICATIONS

European Search Report mailing date of Jun. 17, 2010 for European Application No. 06845195.4 (PCT/US2006/047203).

(Continued)

*Primary Examiner* — Toan To
(74) *Attorney, Agent, or Firm* — Foley & Lardner LLP (57) ABSTRACT

An airbag comprises a pair of fabric layers and a thermoplastic covering on the fabric layers applied by extruding the covering onto a surface of each of the fabric layers. The covering is configured to seal the airbag when heated such that no stitched seam is used to seal the airbag. A primer may be applied between a fabric layer surface and covering to aid in adhesion of the covering to the fabric layer. The airbag can also include internal seams formed by the heat sealed, thermoplastic covering composition.

18 Claims, 5 Drawing Sheets

U.S. PATENT DOCUMENTS

| | | |
|---|---|---|
| 6,645,565 B2 | 11/2003 | Veiga |
| RE42,458 E * | 6/2011 | Keshavaraj .................. 442/218 |
| 2002/0020992 A1* | 2/2002 | Kanuma .................... 280/730.2 |
| 2003/0060104 A1 | 3/2003 | Veiga |
| 2006/0192373 A1* | 8/2006 | Manley ..................... 280/743.1 |
| 2007/0007756 A1* | 1/2007 | Okuno et al. .............. 280/743.1 |
| 2008/0042414 A1* | 2/2008 | Nagaoka ................... 280/743.1 |
| 2009/0179409 A1* | 7/2009 | Hill et al. .................. 280/743.1 |

FOREIGN PATENT DOCUMENTS

| | | |
|---|---|---|
| JP | 10-129380 A | 5/1998 |
| JP | 2003-502522 | 1/2003 |
| JP | 2003-41487 | 2/2003 |
| JP | 2004-524213 | 8/2004 |
| WO | WO 03/011592 A1 | 2/2003 |
| WO | WO 2005/031052 A1 | 4/2005 |

OTHER PUBLICATIONS

Office Action in JP Appln No. 2008-545715 dated May 17, 2011.

Notice of Reasons for Rejection Japanese Patent Application No. 2008-545715 dated Jun. 5, 2012.

* cited by examiner

THERMOPLASTIC COATED, HEAT-SEALED AIRBAG

BACKGROUND

The present invention relates to an airbag fabric which may be a heat sealed airbag. More particularly, the invention relates to a thermoplastic coated thermobondable airbag.

Airbags are used as safety devices in vehicles. Conventional airbags generally incorporate sewn seams to form an inflatable airbag cushion. Some conventional airbags also incorporate sewn seams in conjunction with welding. However, the combination of sewn seams and welding increases the production time in making an airbag cushion, as well as increases the costs of producing the airbag.

SUMMARY

According to an exemplary embodiment, an airbag is provided. The airbag comprises a pair of woven fabric panels. A surface of each fabric panel is covered by an extruded thermoplastic material. The two thermoplastic surfaces are thermobonded together to form an inflatable chamber.

Another embodiment relates to an airbag fabric. The airbag fabric comprises a first layer of woven nylon yarns having a density of less than about 37×37 and a second layer including extruded thermoplastic overlying the first layer.

Yet another embodiment relates to a method of making an airbag. The method comprises providing a first layer of woven fabric comprising nylon yarns having a yarn density less than about 37×37 and extruding a second layer of thermoplastic material onto the first layer. The method also includes thermobonding the second layer with another thermoplastic surface to thereby form an inflatable chamber.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1A:
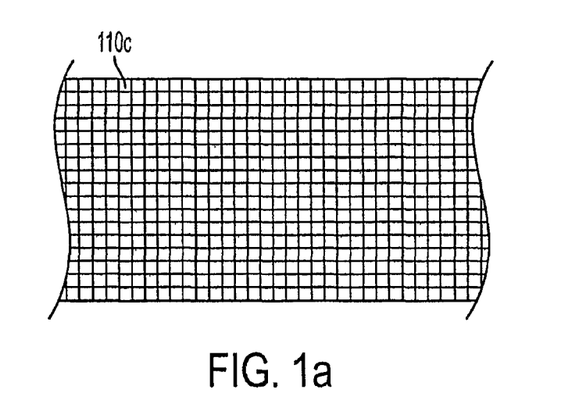
FIG. 1(a) is a top view of a fabric layer of an airbag according to an embodiment of the present invention.
Figure 1B:
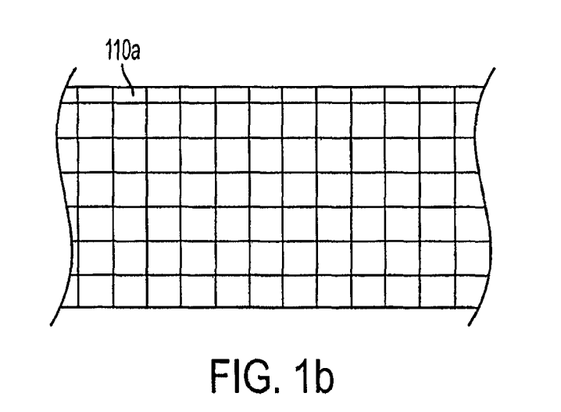
FIG. 1(b) is a top view of a fabric layer of an airbag according to an embodiment.
Figure 2:
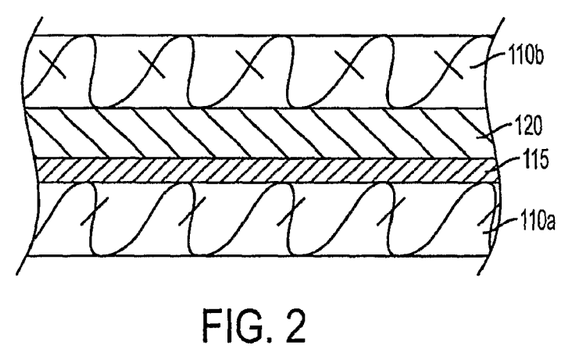
FIG. 2 is a cross-sectional view of an airbag of FIG. 1(b)
Figure 3:
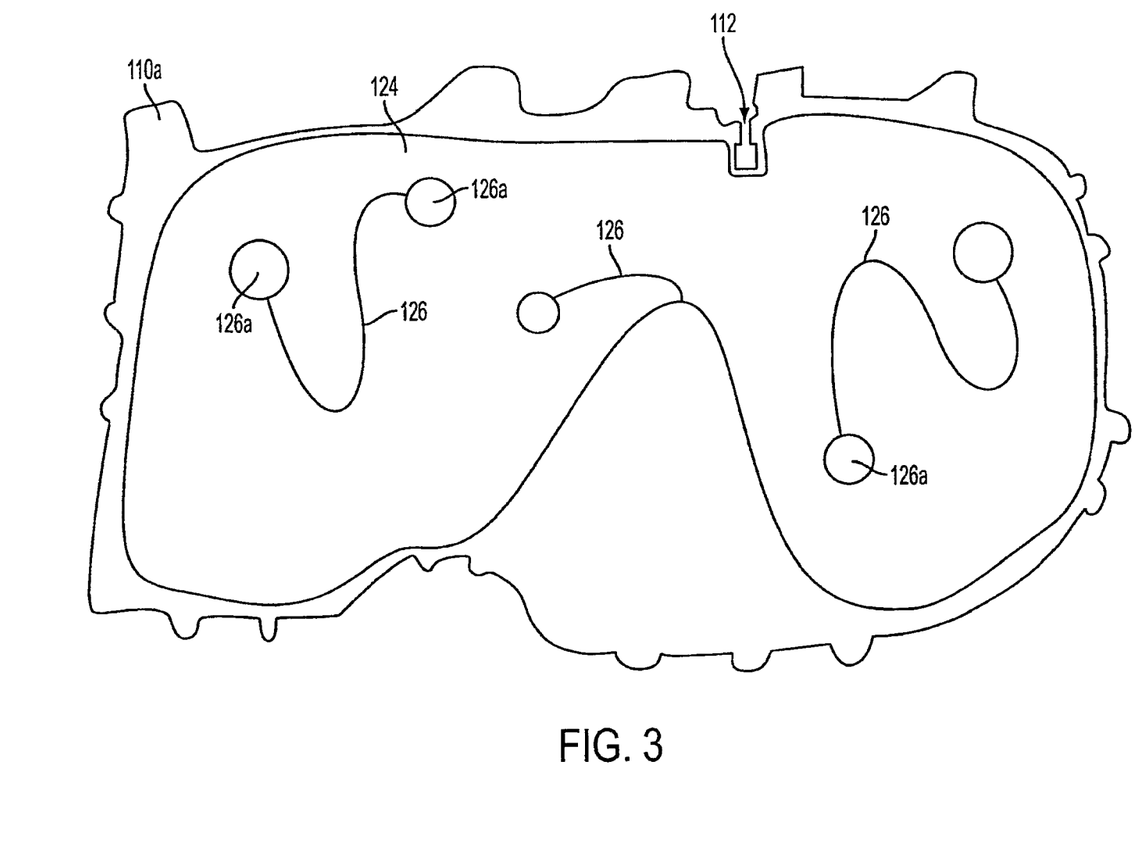
FIG. 3 is a top view of a fabric layer of the airbag of FIG. 1(b).

An embodiment of an airbag and airbag system is shown in FIGS. 1(b), 2 and 3. The airbag 100 includes at least two fabric layers 110a, 110b and a covering (or coating) composition 120 configured to adhere to the fabric layers 110a, 110b to seal the fabric layers 110a, 110b together and form an inflatable chamber, as shown in FIGS. 1 and 3.

The fabric layers 110a, 110b can comprise a matrix of yarns that can be durable, low-weight and flexible. The matrix of yarns can comprise a polyamide, such as woven nylon, or any other suitable material. For example, the fabric layers 110a, 110b comprise a 420 denier nylon. The fabric layers 110a, 110b can have a density of yarns in a range of 4×4 to 41×41. Alternatively, the fabric layers 110a, 110b have a density in the range of 18×18 to 37×37. Furthermore, the fabric layers 110a, 110b can have a density of the yarns less than about 37×37, or, according to another embodiment, the density is less than about 18×18. In yet another embodiment, the density of the yarns is less than about 4×4. FIG. 1(a) illustrates an exemplary fabric layer 110c with a matrix of yarns with a larger density. FIG. 1(b) illustrates an exemplary fabric layer 110a according to an embodiment. The fabric layer 110a has a smaller density than that of FIG. 1(a). The airbag 100 can be formed of either natural or synthetic knit, woven, or non-woven fabric. In an embodiment, the fabric layers 110a, 110b may be of a knit construction based on a 9, 18, 24, or 32 gauge multi-bar Raschel knit machine.

The airbag 100 may generally have any suitable denier Generally, the larger the density (smaller spaces between yarns), the denier size is smaller; and when the density is smaller (greater spaces between yarns, such as 4×4), the denier size is larger. However, the denier size can vary as appropriate. For example, the yarns of the fabric layers 110a, 110b can have a denier of about 150 to 450. In one embodiment, the yarns can have a denier of about 390. The denier of each fabric layer 110a, 110b may be the same or different from each other.

Cover factor is another way of describing density. The cover factor is determined by product of the number of warp yarns per inch and the square root of the warn yarn denier added to the product of the number of weft yarns per inch and the square root of the weft yarn denier. For example, with 420 denier yarns for both the warp and weft yarns and a fabric layer 110a with a yarn density of 37×37, the cover factor is 1516.5487. For further example, with 420 denier yarns and a fabric layer 110a with a yarn density of 18×18, the cover factor is 737.780. Further, with 420 denier yarns and a fabric layer 110a with a yarn density of 4×4, the cover factor is 163.95.

Figure 4:
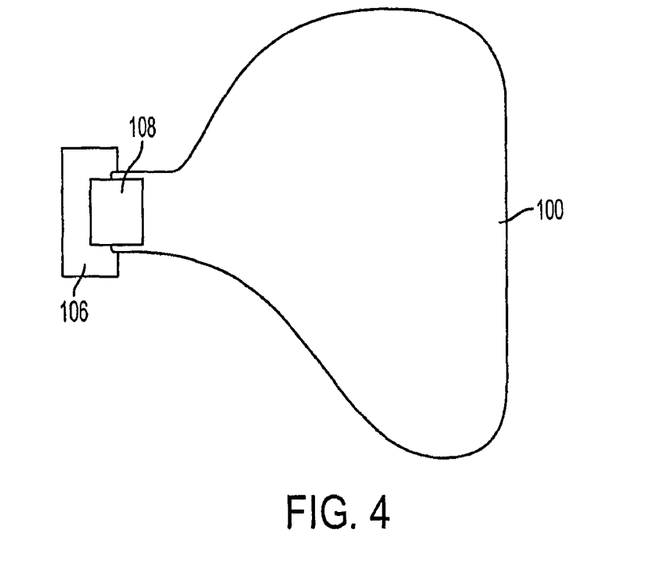
FIG. 4 is a top view of the airbag of FIG. 1(b) in the inflated state.

The airbag 100 can be a side airbag, such as a head-protecting curtain-type airbag. Alternatively, the airbag 100 can be a driver, passenger, knee bolster, or roof-type airbag. The airbag 100 can be part of an airbag system and is inflated by an inflator 108. The inflator 108 may be a cold-type inflator that comprises helium-argon. For example, the inflator 108 may be a 2.1 to 2.5 mole cold gas inflator. In an embodiment, the inflator 108 may be a T-tube style fill tube. The airbag 100 may have one, two, or more pressure ports installed to receive inflation fluid from the inflator 108. Alternatively, any other suitable type of inflator 108 may be used. The airbag 100 and inflator 108 can be connected to a housing 106, such as shown in FIG. 4.

The covering composition 120 can comprise a thermoplastic material. For example, the covering composition 120 can be thermoplastic urethane (TPU) or a thermoplastic olefin (TPO). The covering composition 120 is not limited to TPU or TPO thermoplastics, but can be any suitable thermoplastic material. The thermoplastic urethane of the covering composition 120 can be, for example, TPU PE90, or a TPU BASF low tack composition. The thermoplastic olefin of the covering composition 120 can be, for example, a Bassell TPO.

The covering composition 120 can have a thickness T in a range of 0.2 to 0.6 mils. Alternatively, the thickness T of the covering composition 120 is in the range of 0.2 to 0.5 mils.

Figure 5:
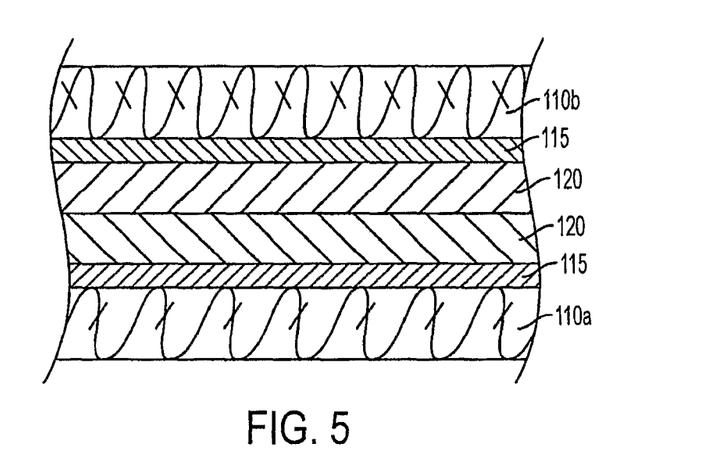
FIG. 5 is a cross-sectional view of an airbag fabric according to another embodiment.

The covering composition 120 can be directly or indirectly extruded onto a first fabric layer 110a of the airbag 100. The covering composition 120 can be positioned between the first and second fabric layers 110a, 110b such that the covering composition 120 is on the inside of the airbag 100. In other words, a first side of the fabric layer 110a is coated with the covering composition 120, such as shown in FIG. 2. The airbag 100 can then form an inflatable cushion by positioning a second fabric layer 110b on top of the first layer 110a. The airbag 100 is then heat sealed, the covering composition 120 forming a bead sealing the airbag at the location of the applied heat, such as, for example, from a die. No stitched seams are required to seal the airbag 100. In an embodiment, only a first side of a first fabric layer 110a has the covering composition applied, such as shown in FIG. 2. In another embodiment, each fabric layer 110a and 110b has the covering composition 120 applied thereto. In that embodiment, shown in FIG. 5, the airbag 110b has a first layer 110a with a covering composition 120 applied thereto, a second layer 110b with a covering composition 120 applied thereto, and the coated sides are positioned together so that the covering composition 120 is on the inside of the airbag 100.

The extrusion process, according to an embodiment, includes providing the covering composition 120 in a pellet form. The pellets (covering composition 120) are heated and delivered to an orifice of a covering machine. The fabric layer 120 advances through the covering machine and the covering composition 120 is deposited onto the fabric layer 110.

Alternatively, the covering composition 120 could be prefabricated and laminated onto the fabric layer 110.

According to an embodiment, the covering composition 120 can be applied directly to the fabric layer 110 without first applying a primer. The covering composition 120 may be applied to the fabric layer 110 in one or more layers. The covering composition could be applied to both sides of the fabric layer 110, or only to one side of the fabric layer, as shown in FIG. 2.

The covering composition 120 is applied to the entirety of a first side of the fabric layers 110a, such as shown in FIG. 3. Of course, both fabric layers 110a can be coated with the covering composition 120. A bead or seam seal the airbag 100 is formed where a heated die is applied. Seam 124 is formed on the fabric layer 110a in order to form the outer peripheral shape of the inflatable airbag 100. Generally, the seam 124 follows along the periphery of the fabric layer 110a. The airbag 100 can include additional seams 126 that can be formed along an internal portion of the fabric layer 110a.

Internal seams 126 can be formed to create additional chambers within the airbag 100 or to help form the overall shape of the airbag 100. The internal seams 126 are formed in the same manner as the outer peripheral seams 124. The internal seams 126 can be circular seams 126a. The circular seams 126a can be completely sealed or filled with covering composition in the inner portion of the circle. Alternatively, the circular seams 126a can just have a part of the inner portion of the circle sealed, or just the outline of the circle.

In another embodiment, tethers (not shown) could be sewn to the circular seams 126a to resist vertical separation of the airbag 100. For example, a first end of a tether could be attached to a first circular seam 126a on a first fabric layer 110. A second end of the tether could be attached to a second and opposite circular seam 126a on a second fabric layer 110.

The internal seams 126 can be formed with segmented sections. Internal seams could begin to "unzip" or rip apart. Once an internal seam begins to rip, the seam continues to separate and an airbag will continue to expand apart. Therefore, according to an embodiment, the internal seams 126 can be formed by separate, discrete segments, such as shown in FIG. 3. The internal seams 126 have gaps in order to prevent a continuous tear in the seam 126. Segmented seams can be used for the internal seams 126, seams near the inflator opening 112 or any other seams.

According to another embodiment, the covering composition 120 can be applied to the fabric layer 110a after the application of a primer 115. In an embodiment, a first fabric layer 110a can have a primer 115 applied thereto and the covering composition 120 applied onto the primer 115. A second fabric layer 110b can then be attached to the covering composition 120 (such as shown in FIG. 2), such that when heat sealed, the fabric layers 110a, 110b form an inflatable chamber. Alternatively, a primer 115 can be applied to both first and second fabric layers 110a, 110b, or no primer 115 can be used.

The primer 115 can be applied to the fabric layer 110a. In an embodiment, the fabric layer 110a can be scoured prior to priming in order to prepare the fabric layer 110a for receiving the primer 115. In another embodiment, an adhesion promoter such as Aziridine or Silianes can be added to the primer 115, such as urethane primers, in order to promote adhesions of the fabric layer 110a to the covering composition 120.

The primer 115 can be any suitable primer. For example, if the covering composition 120 comprises a thermoplastic urethane, the primer 115 can comprise a urethane primer. Alternatively, if the covering composition 120 comprises a thermoplastic olefin, the primer 115 can comprise be an olefin primer.

Figure 6:
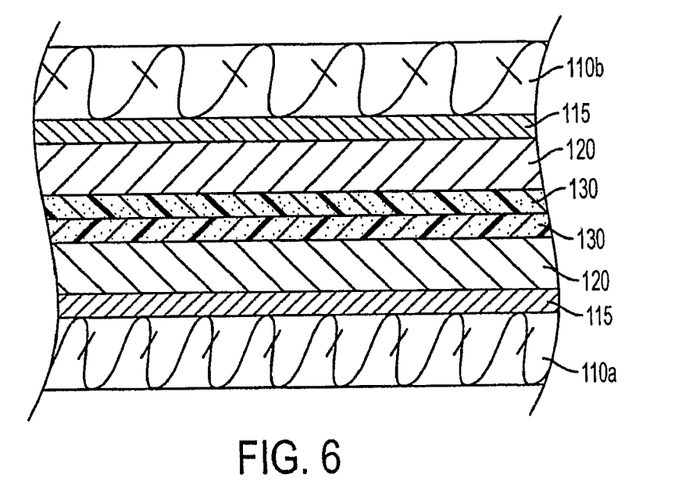
FIG. 6 is a cross-sectional view of an airbag fabric according to another embodiment.

According to another embodiment, such as can be seen in FIG. 6, an anti-stick coat 130, which is configured to prevent blocking or self-sticking of the airbag layers 110a, 110b to each other when the airbag 100 is folded or deploying. The anti-stick coat 130 can comprise a polyether or polyester polyurethane, or any other suitable composition. Alternatively, the anti-stick coat 130 may be incorporated with the extrusion process so the anti-stick 130 is co-extruded with the covering composition 130 onto the fabric layers 110a, 110b.

After the covering composition 120 (and possible primer 115, and anti-stick coat 130) is applied, the second fabric layer 110b is placed on top of the first fabric layer 110a, such that the covering composition 120 is in the middle (inside of the airbag 100), and the layers 110a, 110b are pressed by a die to heat seal the airbag 100. The die can be installed, for example, on a Meyer press.

The die is heated up to a certain temperature in order for the covering composition 120 to form a seal (seams 124, 126) between two fabric layers 110a, 110b. The die can be heated, for example, up to 80°-125° C., depending on the particular covering composition 120.

The die is fixed to a heated platen while the underside of the fabric layers 110a, 110b (when second layer 110b is on top of the first layer 110a) is supported by an immovable platen. This immovable platen is not heated in order to lower the tendency of the fabric layers 110a, 110b to stick together inappropriately (i.e., where the die does not touch the fabric layers 110a, 110b). The first cycle of the die is heated. The second cycle, in the same station, is for cutting away excess fabric. Alternatively, the first and second cycles may be performed in separate stations.

According to an embodiment, a thermochromatic dye can be added to the primer 115 prior to application of the primer 115 to the fabric layers 110a, 110b. The thermochromatic dye changes color depending upon the temperature. The thermochromatic dye can be added to the primer 115 in order to ensure that a proper target bonding temperature has been achieved uniformly. This allows for a visual inspection of the heat sealed airbag 100.

Nipping can be applied to the airbag 100 after the application of the covering composition 120. A nipping pressure applied on the fabric layer 110 helps adhere the covering composition to the fabric layer 110. According to another embodiment, a chill drum can also be used to provide a reduced temperature of the covering composition 120 after application to the fabric layer 110.

Post embossing or post extrusion processing is a process by which a material, such as a fabric layer 110 with a covering composition 120, is altered in either appearance and/or physical properties by the application of additional amounts of heat and/or pressure.

The surface of a covering composition 120, which has been extrusion coated onto the fabric layers 110a, 110b, can be altered to a specific look by embossing a finish into the outer surface of the fabric layers 110a, 110b or covering composition 120. The first part of the process contains an Infrared Oven. The oven is in position just prior to the nipping action of the embossing rolls. Heat is imparted to the surface of the fabric layers 110a, 110b and will begin to soften the surface so that the fabric surface will easily accept the "finish" or pattern contained on an embossing roll. An embossing station comprises at least two rolls that are nipped or squeezed together. One roll is generally a rubber roll which is simply in position to create the nipping action or pressure. The other (embossing) roll is a steel roll which will impart a surface finish to the covering composition 120 or fabric layer 110a, 110b surface.

For the steel roll, the surface will be manufactured to have a particular finish. The finish may be an engraved pattern, which will attempt to simulate a particular design, such as, for example, a leather grain, or a piece of cloth. Alternatively, the finish may not have a particular pattern at all, but instead will have a simple sand blasted finish that will create a sandpaper look or an amorphous finish. Or, the finish might be smooth as chrome to produce a very flat, smooth surface. Accordingly, a variety of surfaces can be imparted to the films based upon the surface of the embossing roll. Any suitable finish may be used.

The surface finish of the embossing roll can add purely aesthetic qualities to the product, but the embossed finish can also be selected to add other technical properties. For example, the roughness of the embossing roll can be selected such that the airbag's 100 coefficient of friction can be controlled or the reflectivity/gloss of the airbag 100 can be controlled.

Improvements in physical properties can be enhanced through post embossing processing. The process begins with the Infrared Oven. The Infrared Oven emits infrared wavelength energy, which heats the surface of the fabric layer 110 and covering composition 120, but because the oven is infrared, the oven also has the capacity to penetrate and heat the inside of the covering composition 120 efficiently. This is in contrast to thermally heating the fabric in gas fired recirculating ovens in which the heating only takes place from the outside surface.

Control systems of the infrared oven are precise enough to exactly measure the temperature of the covering composition 120 and fabric layers 110a, 110b and through a control loop automatically control the amount of energy output to the heaters to maintain a set point temperature.

Through the combined action of heat and pressure in the post embossing station, further annealing of the fabric layers 110a, 110b and covering composition 120 can take place. The annealing can further improve the bond strength between the covering composition 120, primer 115 (if have) and the fabric layers 110.

According to an embodiment, the airbag 100 formed with a thermoplastic covering composition 120 and heat sealing is configured to withstand a pressure of 70 to 100 kPa. In another embodiment, the airbag 100 can withstand a pressure of 75 to 100 kPa. In another embodiment, the airbag 100 can withstand a pressure of 80 to 100 kPa. In another embodiment, the airbag 100 can withstand a pressure of 90 to 100 kPa.

The airbag 100 can also be configured to withstand a pressure of at least 70 kPa for a range of 10 to 25 s. In another embodiment, the airbag 100 can withstand a pressure of at least 70 kPa for a range of 13 to 25 s. In another embodiment, the airbag 100 can withstand a pressure of at least 70 kPa for a range of 17 to 25 s. In another embodiment, the airbag 100 can withstand a pressure of 100 kPa for a minimum of 10 s.

In an embodiment, the airbag 100 is configured to have a breakaway value of 70 lbs. or greater. The breakaway value is a measure of the strength of the bond formed by the seam 124 formed of the covering composition 120 to the fabric layers 110a, 110b (and primer 115). In another embodiment, the airbag 100 is configured to have a breakaway value of 75 lbs. or greater. In yet another embodiment, the breakaway value is in the range of 80 lbs to 150 lbs.

According to an embodiment, a cycle time of forming the airbag 100 is in the range of 4 to 60 seconds. According to another embodiment, the cycle time is in the range of 4 to 12 seconds. In yet another embodiment, the cycle time is in the range of 12-50 seconds.

According to an embodiment, the airbag 100 may be formed by applying the covering composition 120 on a first fabric layer 110a, adding a second fabric layer 110b, compressing the fabric layers 110a, 110b and curing the airbag 100 via an oven and ambient air. The airbag 100 can be moved through a continuous conveyor oven or a batch oven at approximately 55° C. (less then 50% relative humidity ("RH"), such as 25% RH) for about 15 to 20 minutes. The airbag 100 is then removed from the oven and ambient cured for approximately 60 to 75 minutes. The airbag 100 may then be sewn or otherwise utilized.

In another embodiment, a method of making an airbag comprises the steps of providing a first layer of woven or knit fabric comprising nylon yarns having a yarn density less than about 37×37 and extruding a second layer of thermoplastic material onto the first layer to form a composite. The method further comprises the step of thermobonding the two layers of the composite with another thermoplastic surface to thereby form an inflatable chamber.

According to an embodiment, no sealant or additional layer of a material is required to seal the airbag 100.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:
1. An airbag comprising:
a pair of woven fabric panels, a surface of each fabric panel is covered by a coating of an extruded thermoplastic material; and a primer including an adhesion promoter directly applied to a surface of each of the fabric panels and heated to thereby encourage adhesion of the covered surface of each of the fabric panels when coated with the extruded thermoplastic material, wherein the two thermoplastic surfaces are thermobonded together to form an inflatable chamber.

2. The airbag of claim 1, wherein each fabric panel has a density of yarns less than about 37 warp yarns per inch by 37 weft yarns per inch and wherein the yarns have a denier between 390 and 450.

3. The airbag of claim 1, wherein the thermoplastic material comprises a thermoplastic polyurethane material.

4. The airbag of claim 1, wherein the two thermoplastic surfaces are not sewn together.

5. An airbag comprising:
a pair of woven fabric panels, a surface of each fabric panel is covered by a coating of an extruded thermoplastic material,
wherein the two thermoplastic surfaces are thermobonded together to form an inflatable chamber,
wherein each fabric panel has a density of yarns less than about 37 warp yarns per inch by 37 weft yarns per inch and wherein the yarns have a denier between 390 and 450, and
wherein the density of the yarns is less than about 18 warp yarns per inch by 18 weft yarns per inch.

6. The airbag of claim 5, wherein the density of the yarns is less than about 4 warp yarns per inch by 4 weft yarns per inch.

7. The airbag of claim 5, wherein the coating is adhered directly to each of the fabric panels.

8. An airbag fabric comprising:
a first layer of woven nylon yarns having a density of less than about 37 warp yarns per inch by 37 weft yarns per inch;
a second layer including a coating of an extruded thermoplastic overlying the first layer; and
a primer including an adhesion promoter directly applied to a surface of the first layer and heated to thereby encourage adhesion of the thermoplastic to the first layer,
wherein the yarns have a denier between 390 and 450.

9. The airbag fabric of claim 8, wherein the thermoplastic comprises a thermoplastic polyurethane material.

10. The airbag of claim 8, wherein the first layer and the second layer are not sewn together.

11. An airbag fabric comprising:
a first layer of woven nylon yarns having a density of less than about 37 warp yarns per inch by 37 weft yarns per inch; and
a second layer including a coating of an extruded thermoplastic overlying the first layer,
wherein the yarns have a denier between 390 and 450, and
wherein the density of the yarns is less than about 18 warp yarns per inch by 18 weft yarns per inch.

12. The airbag fabric of claim 11, wherein the density of the yarns is less than about 4 warp yarns per inch by 4 weft yarns per inch.

13. The airbag fabric of claim 11, wherein the second layer is directly adhered to the first layer.

14. A method of making an airbag comprising:
providing a first layer of woven fabric comprising nylon yarns having a yarn density less than about 37 warp yarns per inch by 37 weft yarns per inch;
extruding a second layer of a coating of thermoplastic material onto the first layer;
thermobonding the second layer with another thermoplastic surface to thereby form an inflatable chamber; and
providing a primer that includes an adhesion promoter that is directly applied to the first layer,
wherein first layer of woven fabric comprises yarns with a denier between 390 and 450.

15. The method of claim 14, wherein the thermoplastic surface overlies a second fabric layer having a yarn density less than about warp yarns per inch by 37 weft yarns per inch.

16. The method of claim 14, wherein the thermobonding step comprises placing a heated die on the first layer.

17. The method of claim 14, wherein the thermoplastic material comprises a thermoplastic polyurethane material.

18. The method of claim 14, wherein the method does not include a step of sewing the first layer to the second layer.

* * * * *

UNITED STATES PATENT AND TRADEMARK OFFICE
CERTIFICATE OF CORRECTION

| | | |
|---|---|---|
| PATENT NO. | : 8,408,595 B2 | Page 1 of 1 |
| APPLICATION NO. | : 12/086349 | |
| DATED | : April 2, 2013 | |
| INVENTOR(S) | : Schindzielorz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 462 days.

Signed and Sealed this
Twenty-fifth Day of November, 2014

Michelle K. Lee
*Deputy Director of the United States Patent and Trademark Office*